United States Patent
Rafati et al.

(10) Patent No.: US 10,275,655 B2
(45) Date of Patent: Apr. 30, 2019

(54) INTELLIGENT VIDEO THUMBNAIL SELECTION AND GENERATION

(71) Applicant: BroadbandTV, Corp., Vancouver (CA)

(72) Inventors: Shahrzad Rafati, Vancouver (CA); Mehrdad Fatourechi, Vancouver (CA); Lino Evgueni Coria Mendoza, Vancouver (CA)

(73) Assignee: BroadbandTV, Corp., Vancouver, British Columbia (CA)

( * ) Notice: Subject to any disclaimer, the term of this patent is extended or adjusted under 35 U.S.C. 154(b) by 0 days.

(21) Appl. No.: 15/823,234

(22) Filed: Nov. 27, 2017

(65) Prior Publication Data

US 2018/0336419 A1 Nov. 22, 2018

Related U.S. Application Data

(63) Continuation of application No. 15/340,546, filed on Nov. 1, 2016, now Pat. No. 9,830,515, which is a
(Continued)

(51) Int. Cl.
*G06K 9/00* (2006.01)
*G06F 17/30* (2006.01)
*G06K 9/62* (2006.01)

(52) U.S. Cl.
CPC ..... *G06K 9/00751* (2013.01); *G06F 17/3028* (2013.01); *G06F 17/30247* (2013.01);
(Continued)

(58) Field of Classification Search
None
See application file for complete search history.

(56) References Cited

U.S. PATENT DOCUMENTS 7,643,657 B2 1/2010 Dufaux et al.
7,801,893 B2 9/2010 Gulli et al.
(Continued)

FOREIGN PATENT DOCUMENTS

CA 2770239 A1 10/2011
WO 2013133901 A2 12/2013

OTHER PUBLICATIONS

L. Itti et al. "Bayesian Surprise Attracts Human Attention" In Advances in Neural Information Processing Systems, vol. 19, Cambridge, MA:MIT Press, 2006, pp. 547-554.
(Continued)

*Primary Examiner* — Hadi Akhavannik
(74) *Attorney, Agent, or Firm* — Holzer Patel Drennan

(57) ABSTRACT

In accordance with one embodiment, an intelligent video thumbnail selection and generation tool may select a relevant and visually stimulating image from a video file and generate a thumbnail including the image. The image may be selected by computing a relevancy metric for an image in the file based on one or more selected relevant features, and comparing that relevancy metric with the metric of at least one other image in the file. In another embodiment, a series of images in a video file may be divided into shots. One of the shots may be selected based on a shot relevancy metric and a key image from the shot may be selected as a thumbnail based on a key image relevancy metric, where the shot relevancy metric and the key image relevancy metrics may be computed based on one or more relevant content features.

20 Claims, 7 Drawing Sheets

Related U.S. Application Data continuation of application No. 14/051,285, filed on Oct. 10, 2013, now Pat. No. 9,514,536.

(60) Provisional application No. 61/712,067, filed on Oct. 10, 2012, provisional application No. 61/778,569, filed on Mar. 13, 2013.

(52) U.S. Cl.
CPC ... *G06F 17/30843* (2013.01); *G06K 9/00275* (2013.01); *G06K 9/00281* (2013.01); *G06K 9/6215* (2013.01)

(56) References Cited

U.S. PATENT DOCUMENTS

| | | | |
|---|---|---|---|
| 8,634,657 | B2 | 1/2014 | Sakamoto |
| 9,830,515 | B2* | 11/2017 | Rafati ............... G06K 9/00751 |
| 2006/0015495 | A1 | 1/2006 | Keating et al. |
| 2006/0222244 | A1 | 10/2006 | Haupt et al. |
| 2006/0245624 | A1 | 11/2006 | Gallagher et al. |
| 2007/0147683 | A1 | 6/2007 | Hwang et al. |
| 2008/0166025 | A1 | 7/2008 | Thorne |
| 2008/0239104 | A1 | 10/2008 | Koh |
| 2010/0034470 | A1 | 2/2010 | Valencia-Campo et al. |
| 2011/0038512 | A1 | 2/2011 | Petrou et al. |
| 2012/0106925 | A1 | 5/2012 | Dirik et al. |
| 2013/0238990 | A1 | 9/2013 | Ubillos et al. |
| 2013/0239063 | A1 | 9/2013 | Ubillos et al. |
| 2014/0099034 | A1* | 4/2014 | Rafati ............... G06K 9/00751 |
| | | | 382/209 |

OTHER PUBLICATIONS

J.D. Laffety et al. "Conditional Random Fields: Probabilistic Models for Segmenting and Labeling Sequence Data" Proc. 18th International Conference on Machine Learning (ICML01) 2001, pp. 282-289.
A. McCallum et al. "Early Results for Named Entity Recognition with Conditional Random Field, Feature Induction and Web-Enhanced Lexicons" In Seventh conference on Natural Language Learning (CoNLL) 2003, pp. 188-191.
H. Kellerer et al. Knapsack Problems, Springer, 2004, 5 pages.
R. C. Gonzalez et al. Digital Image Processing (3rd Edition) Prentice Hall, 2007 pp. 331-339.
R. C. Gonzalez et al. Digital Image Processing (3rd Edition) Prentice Hall, 2007 pp. 572-585.
R. C. Gonzalez et al. Digital Image Processing (3rd Edition) Prentice Hall, 2007 pp. 612-617.
D. Chen et al. "Text Detection and Recognition in Images and Video" IDIAP Research Report, vol. 37, 2004,pp. 595-608.
Y. Pan et al. "A Hybrid Approach to Detect and Localize Texts in Natural Scene Images" IEEE Trans. on Image Proc., vol. 20, No. 3, 2011, pp. 800-813.
X. Zhao et al. "Text From Corners: A Novel Approach to detect Text and Caption in Videos" IEEE Trans. on Image Proc., Vo. 20, No. 3, 2011, pp. 790-799.
M. Lyu et al. "A Comprehensive Method for Multilingual Video Text Detection, Localization, and Extraction" IEEE Trans. on Circuits and System Video Tech., vol. 15, No. 2, 2005, pp. 243-255.
R. Leinhart et al. "Automatic Text Recognition in Digital Videos" Proceedings SPIE. Image and Video Processing IV, 1996, pp. 2666-2675.
S. Lloyd, "Least Squares Quantization in PCM" IEEE Translations on Information Theory, vol. IT-28, No. 2, 1982, pp. 129-137.
C.D. Manning et al. "An Introduction to Information Retrieval" Cambridge University Press, 2009, pp. 158-162.
S. Maretllo et al. Knapsack Problems Algorithms and Computer Implementations, John Wiley & Sons, 1990, pp. 13-15.
S. Maretllo et al. Knapsack Problems Algorithms and Computer Implementations, John Wiley & Sons, 1990, pp. 36-45.
S. Maretllo et al. Knapsack Problems Algorithms and Computer Implementations, John Wiley & Sons, 1990, pp. 36-4.
J. Otero-Milan et al. "Saccades and Microsaccades During Visual Fixation, Exploration, and Search: Foundations for a Common Saccadic Generator", Journal of Vision, Dec. 18, 2008, vol. 8, No. 14, Article 21, pp. 1-18.
F. Dufaux, "Key Frame Selection to Represent A Video", ICIP 2000, vol. 2, pp. 275-278.
M. Cooper et al. "Discriminative Techniques for Keyframe Selection", IEEE International Conference on Multimedia and Expo, IEEE International Conference on Image Processing (ICME) 2005, pp. 1-4.
C. Chamaret et al. "Spatio-Temporal Combination of Saliency Maps and Eye-Tracking Assessment of Different Strategies", in IEEE International Conference on Image Processing (ICIP). Hong Kong, 2010 pp. 1077-1080.
C. Guo et al. "Spatio-temporal Saliency Detection Using Phase Spectrum of Quaternion Fourier Transform" In IEEE Conference on Computer Vision and Pattern Recognition, Anchorage, Alaska, 2008, pp. 1-8.
A. Doherty et al. "Investigating Keyframe Selection Methods in the Novel Domain of Passively Captured Visual Lifelogs", International Conference on Content-based image and video retrieval (CIVR '08) ACM, New York, 2008, pp. 259-268.
W. Hu et al. "A Survey on Visual Content-Based Video Indexing and Retrieval" IEEE Trans. on Systems, Man and Cybernetics-Part C; Applications and Reviews, vol. 41, Issue 6, Nov. 2011, pp. 797-819.
L. Itti, Automatic Foveation for Video Compression Using a Neurobiological Model of Visual Attention, IEEE Trans. on Image Processing, Oct. 2004, vol. 13, issue 10, pp. 1304-1318.
J. Kovac et al., "Human Skin Colour Clustering for Face Detection" IEEE Region 8 EUROCON 2003. Computer as a tool, Sep. 22-24, 2003, vol. 2, pp. 144-148.
C. Rother et al, "Interactive Foreground Extraction using Iterated Graph Cuts" In ACM SIGGRAPH 2004 Papers, pp. 309-314.
B. Suh, "Automatic Thumbnail Cropping and its Effectiveness" In Proceedings of the 16th Annual ACM Symposium on User Interface Software and Technology (UIST '03) ACM, New York, 2003, pp. 95-104.
V. Vezhnevets, "A Survey on Pixel-Based Skin Color Detection Techniques" Cybernetics, 85(1), pp. 85-92.
P. Viola et al. "Rapid Object Detection Using a Boosted Cascade of Simple Features" Proceedings of 2001 IEEE Computer Society Conference on Computer Vision and Pattern Recognition CVPR 2004, vol. 1 (Apr. 15, 2004), pp. I-511-I518.
Y. Chung et al. "A Non-Parametric Blur Measure Based on Edge Analysis for Image Processing Applications" Proceedings of the 2004 IEEE conference on Cybernetics and Intelligent Systems, Dec. 1-3, 2004, vol. 1, pp. 356-360.
W. Zhao et al. "Face Recognition: A Literature Survey" ACM Computer Survey 35, Dec. 4, 2003, pp. 399-458.
C.M. Bishop, Pattern Recognition and Machine Learning, Springer 2008, pp. 424-430.
TESSERACT OCR Library http://code.google.com/p/tesseract-ocr/ downloaded Jul. 30, 2014.
D. Gusfield, "Algorithms on Strings, Trees, and Sequences:Computer Science and Computational Biology" Cambridge UK University Press, 1997, pp. 215-216.
C.D. Manning et al., "Introduction to Information Retrieval" Cambridge University Press, 2008. 18 pages.
L. Itti et al. "A Principled Approach to Detecting Surprising Events in Video" In: Proc. IEEE Conference on Computer Vision and Pattern Recognition (CVPR), Jun. 2005, pp. 631-637.
Sameer Antani, et al., A Survey on the Use of Pattern Rescognition Methods for Abstraction, Indexing and Retrieval of Images and Video, The journal of the Pattern Recognition Society, Jan. 6, 2014.
Yuli, Gao, et al. "Thematic Video Thumbnail Selection" Image Processing (ICIP) Nov. 2009.
Weigang Zhang, et al. "A Novel Framework for Web Video Thumbnail Generation" Intelligent Information Hiding and Multimedia Signal Processing, Jul. 2012.

\* cited by examiner

INTELLIGENT VIDEO THUMBNAIL SELECTION AND GENERATION

This application is continuation application of U.S. application Ser. No. 15/340,546 filed on Nov. 1, 2016 and titled "Intelligent Video Thumbnail Selection and Generation," which is a continuation of U.S. application Ser. No. 14/051,285, filed on Oct. 10, 2013 and titled "Intelligent Video Thumbnail Selection and Generation," which claims the benefit U.S. provisional patent applications 61/712,067 filed on Oct. 10, 2012 and 61/778,569 filed on Mar. 13, 2013. Each of these applications is hereby incorporated by reference for all that they disclose or teach.

BACKGROUND

Video sharing websites such as YouTube.com™ facilitate user searches for video content and make a large number of videos viewable by the public. When a user performs a keyword search for video content, the user may be offered a series of thumbnail images representative of videos returned in the search. High-traffic video sharing websites maintain user-searchable indices and may add hundreds or even thousands of additional videos every day. Therefore, one challenge that website managers face is the need to quickly generate thumbnail images representative of each new video uploaded. Increased viewership of certain videos is desirable, in particular, by advertisers that display advertisements alongside videos or before, during, or after a video is played. Therefore, another challenge is ensuring that the thumbnails will be both visually stimulating and representative of the content in the underlying video so that the user will be encouraged to click on the thumbnail and view the associated video.

SUMMARY

Embodiments described herein may be utilized to address at least one of the foregoing problems by providing systems and methods for quickly selecting and generating thumbnail images that are relevant and visually stimulating. In one embodiment, a relevancy metric is computed for an image in a video file based on a selection of content features and a representative image is selected as a thumbnail based on a comparison between the relevancy metric of the image and the relevancy metric of at least one other image in the video file. In another embodiment, a series of images in a video file are divided into shots. One of the shots is selected based on a shot relevancy metric and an image from the shot is selected as a thumbnail based on an image relevancy metric, where the shot relevancy metric and the image relevancy metric are computed based on one or more features of the content in each image or shot.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
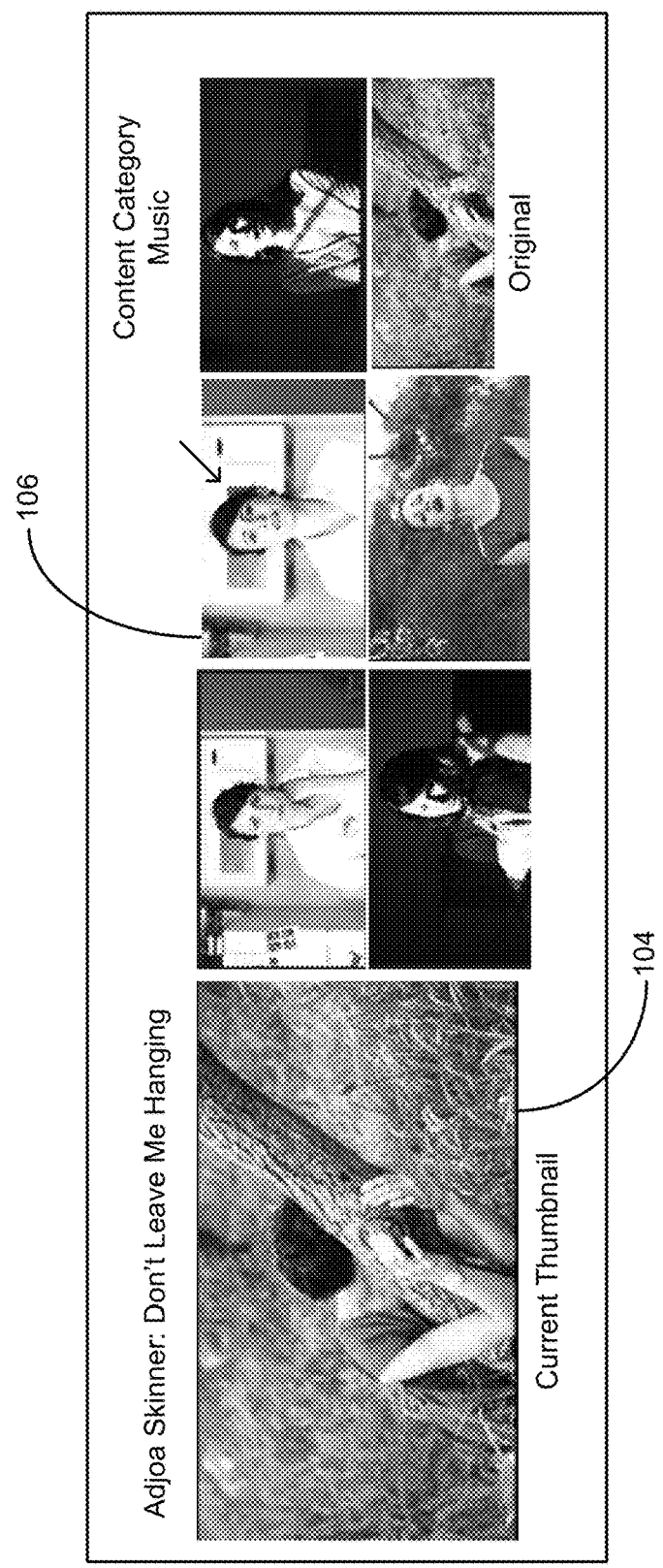
FIG. 1 is an example of a user interface for selecting thumbnail image for a video, in accordance with one embodiment.

Online video content providers of high-traffic video-sharing websites seek to quickly generate thumbnail images representative of the video content in each of a number of different videos. For some websites it is also important that the representative thumbnail images be visually exciting and/or stimulating to entice viewers to click on videos sponsored by various advertisers. However, automated thumbnail generation processes do not always guarantee that the thumbnail images selected to represent a video will be either visually stimulating or particularly representative of the corresponding video content. Indeed, some online video distribution systems merely generate thumbnails from random portions of the video, such as at the 25%, 50%, and 75% mark in the video. A choice is then made from one of the three random thumbnails. This rigid and non-intelligent method for selecting the thumbnails cannot guarantee that any of the proposed thumbnails will be visually pleasing or a good representation of the content. Moreover, it can be costly and time-consuming to require content providers or content managers to hand-select and, if needed, modify thumbnail images. Therefore, in accordance with one embodiment, a tool may be utilized that selects and generates a representative thumbnail image for a video that is both relevant and visually stimulating.

A thumbnail selection and generation tool can intelligently select a thumbnail image for a video file by computing a relevancy metric for one or more frames in the video based on features indicative of whether the frame image is visually stimulating and relevant to the corresponding video file. A representative frame is selected as the thumbnail image based on a comparison between the relevancy metric of one or more additional frames.

An image is visually stimulating if it temporarily increases electrochemical activity in the brain. For example, an image is visually stimulating if it arouses or holds the viewer's attention, sparks curiosity, or creates interest or excitement. Accordingly, a thumbnail image may be considered visually stimulating if it contains bright colors or significant contrast, texture, complex or unusual shapes, living subjects, etc.

In accordance with one embodiment, a thumbnail is considered to be a good and effective thumbnail if it meets one or more of the following criteria:

Clear, in-focus, hi-resolution
Bright, high contrast
Close-ups of faces (if relevant to the content)
Visually-compelling imagery
Well-framed, good composition
Foreground stands out from background
Looks great at both small and large sizes
Accurately represents the content A thumbnail image is relevant to a corresponding video file when the image is representative of the subject matter or subjects featured in the video. For instance, a dark frame at the beginning of a scene is neither relevant nor visually stimulating. However, a frame in a cooking video featuring a chef in a kitchen wearing a tall white chef's hat is relevant because it indicates the subject matter of the video. This image may be considered visually stimulating because it includes a living subject and recognizable objects; however, the image may be considered even more visually stimulating if, for example, the image is a clear close-up of the chef's face and the viewer is able to observe a facial expression conveying emotion.

Throughout this disclosure, the term "frame" refers to not only a frame within a motion picture or animation file, but also a slide within a presentation file (e.g., a PowerPoint slide) where the file may or may not have an accompanying audio track. A thumbnail image is an image representative of a corresponding file, wherein the thumbnail is based on at least one frame of the file. A thumbnail can be of any size and may contain text, graphics, or additional enhancements not originally present in the frame that is selected as the thumbnail image. In at least one embodiment, the thumbnail image may contain text or graphics. The term "image" used herein is understood to include a "frame."

FIG. 1 illustrates an example of a user interface for selecting a more preferred thumbnail image. In FIG. 1 a group of images for a particular video file are displayed. The image in block 104 is the default image that was assigned to the video. The default image could be assigned in a variety of ways. For example, it could be the thumbnail image that was originally provided by a video distribution site, such as YouTube. After processing the video, a group of alternative thumbnail images can be suggested. Five of these suggested images are shown to the right of block 106 along with the original image. The five suggested images provide potentially better alternatives than the original image for the purpose of being relevant and of interest to a potential user. For example, the original image in block 104 shows the singer but her face is obscured by a tree. The other images present the singer's face more visibly. In the example of FIG. 1, the arrow indicates that the user selects the image designated as block 106. This image presents a clear view of the singer's face and is a larger facial image than the other images. However, the user has discretion as to which of the five images to select. Once the user selects an image to be a thumbnail, that image is moved to block 104 and the user interface can present a button that allow the user to confirm selection as a thumbnail. Once the user selects the button, the thumbnail can be transferred to the video distribution site for use as a thumbnail image for the associated video.

Figure 2:
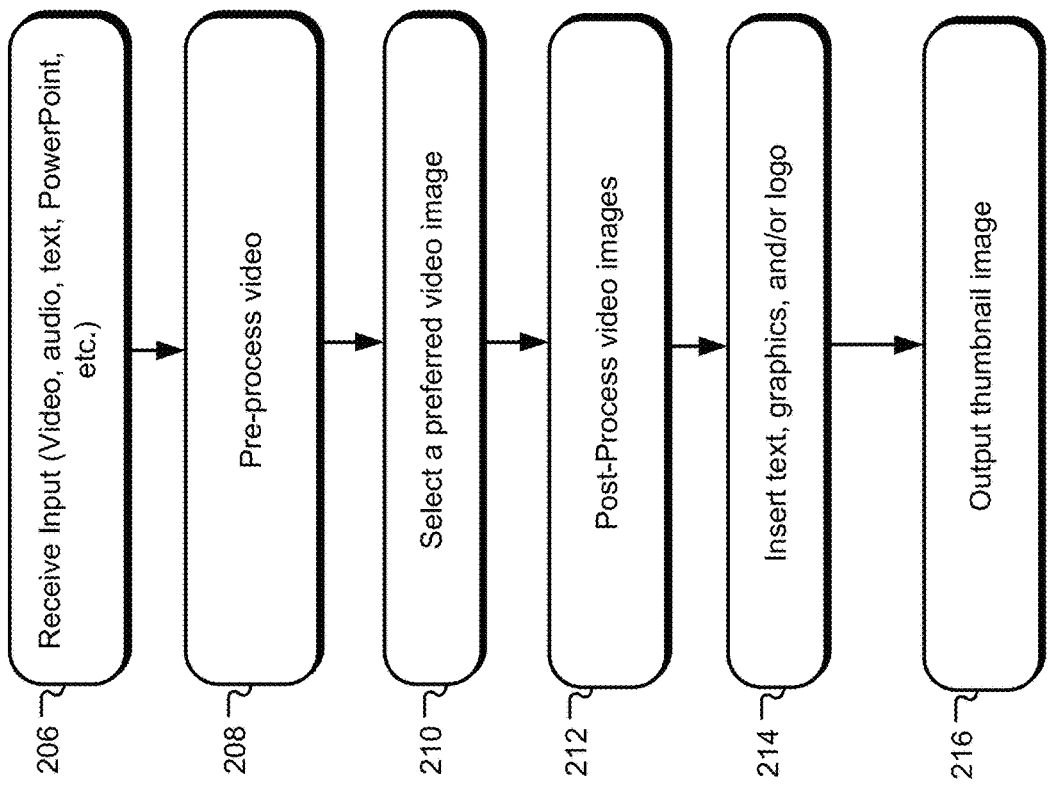
FIG. 2 is a flow chart illustrating a method of processing an input file in order to generate a representative image, in accordance with one embodiment.

FIG. 2 illustrates an implementation for selecting a thumbnail image that is representative of content. In operation 206, a content provider provides content that is received as an input. This content can be a video file, audio file, text, or PowerPoint presentation, for example. For purposes of this example, a video file will be used as the example. In operation 208, the video file is pre-processed. The pre-processing operation can include resizing and filtering. In operation 210, a selection of the best video frames is automatically made. The proposed best video frames can then be manually refined by the content provider. In operation 212, post-processing of the best video frames is implemented. The post-processing operation can include, for example, image resizing, cropping, and image enhancement. In operation 214, text, graphics or image (such as logo) insertion can be implemented. Operation 216 illustrates that thumbnails may then be output.

In one embodiment, video and audio pre-processing is performed prior to thumbnail image selection. Video processing methods are often computationally expensive. Pre-processing can reduce a portion of that computational expense. The video and audio pre-processing may include temporal down sampling and frame size reduction. Digital videos may offer many frames per second so temporal down sampling can eliminate redundancies without losing relevant visual information. For example, in order to create the illusion of movement, digital videos frequently offer about 15 to 30 frames for every second. Therefore, there is some redundancy in adjacent video frames. That redundancy provides the opportunity to drop a large amount of frames without losing any relevant visual information.

In the same or a different embodiment, the frames are downsized, preserving the original aspect ratio. Downsizing may be desirable to reduce the total number of computations necessary to complete the intelligent thumbnail selection and generation process. It should be noted that other solutions for reducing the amount of computation might also be employed. Some examples include combining a number of successive frames using some weighting function or reducing the number of frames per second using a nonlinear frame-reduction function.

Figure 3:
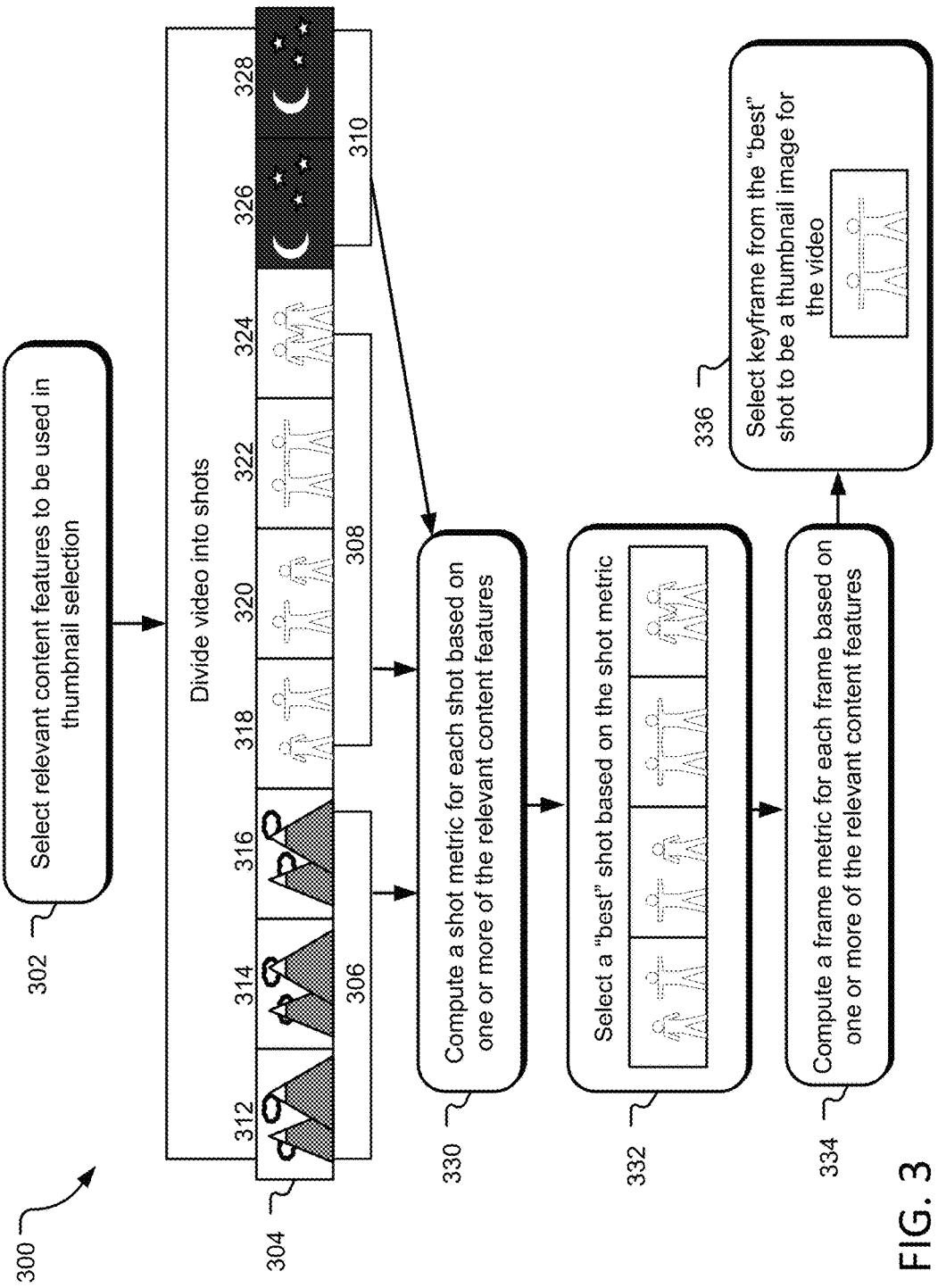
FIG. 3 is an example operation 100 for selecting and generating relevant and visually stimulating thumbnails.

FIG. 3 is an embodiment of an example operation 300 for selecting a representative thumbnail image for a video. The video is a file having any frame rate, aspect ratio, size, or length that may or may not have an audio track. The video may be any of a number of file types including, but not limited to, MPEG, MPEG2, H.264, HEVC, FLV, SWF, AVI, MP4, WMV, etc.

Content creators can also specify what category the video belongs to as an input. Examples of the categories include but are not limited to:

Movie, movie trailer or movie clip
Video games
Animation
Music video
Game play
Vlog (Video blog)
Sports clip
News clip A selection operation 302 selects one or more content features relating to the video file to be used in the thumbnail image selection operation 300. A content feature is a feature that allows a frame or group of frames to be evaluated in a meaningful way that assists in the selection of relevant and visually stimulating thumbnails. For example, a content feature may be: contrast, brightness, texture, sharpness, camera movement, the presence of "skin-colored" pixels, the number of faces present, the number of open eyes, whether the eyes are open or closed, the size of faces or other human features visible, text or other objects that are identifiable in each frame, etc.

In one embodiment, a content feature is contrast. It is believed that viewers of videos respond better to high contrast images. Therefore, frames with high contrast are often preferred.

Image brightness can also be a feature. In one embodiment, very dark or very bright images are avoided.

In one embodiment, a content feature is camera movement. One can better understand the visual quality of a frame by understanding how it fits in relationship with its adjacent frames. One way of achieving this is through using the camera movements. For example, if the camera is zooming in, zooming out, or moving from left to right or from top to bottom, then the image is more likely to be blurry. Therefore, frames exhibiting camera movement may not be desirable as thumbnails.

A zooming in feature identifies if a frame is part of a shot where the camera is zooming in. As an example, frames with camera movement might have a lower ranking than frames that belong to a steady shot.

A zooming out feature identifies if a frame is part of a shot where the camera is zooming out. As an example, frames with camera movement might have a lower ranking than frames that belong to a steady shot.

A panning feature identifies if a frame is part of a series of frames where the camera is panning, e.g., moving from left to right or from right to left. Frames that fit into this category are likely to be blurry and therefore, would have a lower ranking than frames coming from a steady shot.

A tilting feature identifies if a frame is part of a series of frames where the camera is tilting, e.g., moving from top to bottom or from bottom to top. Frames that fit into this category are likely to be blurry and therefore, should have a lower ranking than frames coming from a steady shot.

Image texture can also be a content feature. Images containing a lot of texture tend to be visually stimulating and may thus be desirable as thumbnails. In one embodiment, an image texture value is arrived at by calculating the standard deviation for every channel in a frame. Examples of color channels include but are not limited to RGB (Red; Green; Blue), YCbCr (Luminance; Chroma: Blue; Chroma: Red) and HSV (Hue; Saturation; Value). Standard deviations for each channel are averaged to obtain a single standard deviation value for each frame. In another embodiment, an image texture value is calculated by dividing a color frame into three channels such as Y, Cb and Cr and calculating the standard deviation of the Y component for each frame. A higher average standard deviation is indicative of more texture in an image, so a frame featuring many objects, colors and shapes will have a higher channel standard deviation than an image of a green wall or a blue sky. In other embodiments, alternate methods of calculating texture may be employed.

Images containing live entities such as animals and especially people are more likely to be relevant and visually stimulating than other type of images. Thus, the number of pixels in a frame that are "skin-colored" may also be a content feature indicative of the visual appeal and relevance of a particular image. In an embodiment utilizing a "skin-color" relevance feature, a range of pixel color values may be defined as "skin-colored." A pixel falling within this range does not necessarily represent skin, but a large number of such pixels may tend to indicate that it is more likely the frame includes people and is therefore relevant and visually stimulating.

A shot having one or more human faces is also likely to be visually stimulating and relevant. Thus, the number of human faces in every frame or shot may also be a content feature. The number of human faces may be detected by employing one or more machine-learning modules designed to extract and recognize faces from cluttered shots. Methods of detecting faces can be implemented, for example, by the following steps: segmentation of faces (face detection) from cluttered screens, feature extraction from the face regions, and recognition or verification.

Thumbnail images with close-ups of people may be more likely to capture a viewer's attention than shots containing dozens of people. For instance, an image including face that is large compared to the size of the frame may be more desirable as a thumbnail than a small face if a viewer is able to readily identify an interesting facial expression. Thus, the size of faces visible in a frame may be a content feature. In one implementation, the size of the largest face on a frame is estimated and used as content feature.

An image with the subject's eyes open may be more appealing than one with the eyes closed. Therefore, the number of eyes or open eyes may be a content feature indicative of a visually stimulating, relevant image. The number of open eyes in an image may be determined by employing a number of methods including but not limited to pattern, color matching, or object recognition algorithms.

In alternate embodiments, relevant features chosen may include human and animal features besides skin color, such as the number of human or animal heads, arms, legs, etc. Such features may be identified by, for example, employing one or more machine-learning modules, such as an object recognition library. Other embodiments may utilize machine learning modules to calculate, for example, specific objects, events, and places.

In alternate embodiments, one or more composition-based features are selected as the content features. For instance, a content feature may be whether a region of interest in the frame is located near the center of the frame. Popular online video distribution systems such as YouTube feature a triangular "play icon" in the center of the thumbnail. Therefore, it may be desirable to have thumbnails that do not have a primary region of interest in the center of the frame where it is likely to be covered up. A number of methods may be employed to determine whether an object of interest is located in the center of a frame. As an example, in one embodiment, a saliency map can be used. The saliency map may indicate the importance of every pixel on the image. One example of a saliency map is a gray scale 2D array with the same dimensions as a source image. A saliency map is usually computed by employing some image features such as color, brightness and edges. If the images are video frames, then motion can also be used as a saliency indicator.

Another composition-based feature is how balanced an image is. Many visual artists use the "rule of thirds" as a guideline for creating a pleasing, balanced composition. The objective is to locate the region of interest near one of the lines that divides the image into three equal columns and rows. It can then be determined whether the frame follows the "rule of thirds" or not. Similarly, the "rule of odds" states that by framing the object of interest with an even number of surrounding objects, the framed object becomes more comforting to the eye. The "rule of odds" thus creates a feeling of ease and pleasure.

In another embodiment, the blurriness or depth of field is a content feature. For example, if the foreground of an image is sharp and the background is blurry, then the image may have a small depth of field. Therefore, it may be desirable to select a representative thumbnail image having a larger depth of field. However, it should be appreciated that images that feature a small depth of field may occasionally make good thumbnails since this implies that the foreground is isolated from the background. For instance, a clear image of a face against a blurry background might make an appealing thumbnail. Therefore, in an alternate embodiment, priority may be given to certain images having a small depth of field, especially when the sharp region of the frame includes an object of interest (e.g., a face).

In one embodiment, the sharpness of an image is computed by computing the edges and counting the number of pixels that are part of these edges as well as their magnitudes. Moreover, a video frame can be divided into a number of blocks (e.g., four). Each block can be measured for sharpness. If at least one of the blocks is sharper than a predetermined threshold, then the image is considered to be sharp. For the case of frames featuring faces, the sharpness detection process can be applied, for example, to the region with the largest face.

In another embodiment, text is a content feature. An optical character recognition module (OCR) may be utilized to extract text from selected frames of a video file, and the extracted text may be utilized in selecting and generating a thumbnail image. For example, an OCR may parse a presentation file for slides containing the title of the presentation. One or more frames containing the title may be given more weight in the thumbnail image selection process.

In yet another embodiment, audio feature information may be utilized as a content feature in selecting the best potential thumbnails from a video file. For example, if higher volume or higher intensity music is identified in a portion of a video relative to other portion(s) of the video, then the video frames associated with that music are more likely to be exciting and thus visually stimulating. Likewise, speech recognition modules may be utilized alone or in conjunction with facial recognition modules to determine whether an image should be selected as a thumbnail.

One embodiment utilizes a database with faces of famous people or characters including politicians, athletes, cartoon characters, celebrities, and movie stars. The database may be employed to determine whether a video features any famous people or characters that are in the database. If so, one or more images featuring such persons or characters may be recommended as a thumbnail image.

Another embodiment utilizes a database with famous scenes and objects including famous buildings, landmarks, or brands. The database may be employed to determine whether a video features any famous building, landmark, brand, object, etc. that are in the database. If so, one or more images featuring such buildings, landmarks, brands, or objects may be recommended as a thumbnail image.

In FIG. 3, a division operation 304 divides the video into different shots (also referred to herein as scenes), 306, 308, and 310, where a shot is a sequence of frames captured by a single continuous operation of the camera. Shot boundaries may be identified by detecting changes in spatial continuity. For example, a significant difference in the color histogram of two adjacent frames may indicate a shot boundary.

In one embodiment, shot boundaries are determined by comparing color histograms of adjacent frames. In an alternate embodiment, each frame is divided into different color channels (e.g., R, G, and B in RGB space) in a specific color space such as RGB. Histograms of each channel are computed and averaged for each frame. The average histogram for each frame is then correlated with the average histogram from the previous frame. If the correlation value computed for two given frames is lower than a predetermined threshold value then it will be assumed that the two frames are from two different shots.

Referring back to FIG. 3, the shot boundaries may therefore be identified by comparing average color histograms of each of frames 312, 314, 316, 318, 320, 322, 324, 326, and 328 with adjacent frames. For example, the histogram of frame 310 may be compared to frame 312. Because both shots capture similar scenery, the average color histograms are closely correlated. However, when the average histogram of frame 324 is correlated with the average histogram of frame 326, the correlation value is much lower because the two frames capture very different imagery. Thus, the correlation value falls below a predetermined threshold value and the frames are partitioned into two different shots, 308 and 310 respectively.

In one embodiment, the threshold value may be dynamically altered if very few or only one shot is initially found. If it is determined that there is only one actual shot in a video file, artificial shots may be created by dynamically lowering the threshold value so that the single shot can be divided into two or more shots. The "threshold shot length", which determines the number of shots available, may be a function of the number of thumbnails ultimately desired. In one embodiment, the threshold shot length is set to ensure that the number of shots (N) is at least twice the number of thumbnails that are desired. This embodiment may be desirable because it permits thumbnail image selection for single-shot videos.

In an alternate embodiment where the video file contains only one shot, the video is not partitioned into artificial shots. Rather, the thumbnail generation process begins at computation operation 334, where a frame relevancy metric is computed for each frame.

In yet another embodiment where there are multiple shots in a video, the video is not divided into shots. Rather, a frame metric is computed for each frame or a selection of frames and a representative frame is selected based on the frame metric.

A computation operation 330 computes a shot metric for each shot based on one or more of the selected content features. The shot metric is a value that represents the overall relevancy and visual appeal of each shot. For each of the content features selected, a representative numerical value may be computed and factored into the shot metric computation.

In one embodiment, the average value of every feature is computed using all of the frames in the shot (e.g., average texture value for frames in the shot, average number of skin-colored pixels for frames in the shot, etc.). Once the average content feature values are calculated for each shot, the average values are normalized based on the maximum average content features in all shots. A shot relevancy metric is computed based on the normalized average content feature values for each shot.

In another embodiment, the median value of every feature is computed using all of the frames in the shot. Once the median feature values are calculated for each shot, they are normalized based on the maximum median value of the features in all shots. A shot relevancy metric is computed based on the normalized values of content features for each shot.

In another embodiment, the shot relevancy metric is based on a weighted sum of values representing the content feature values for each frame. The weighted sum is multiplied by the length of the shot (the number of frames in the shot) to obtain the shot relevancy metric. Longer shots may be given more weight than shorter shots because they tend to indicate relevance from a storytelling point of view. For instance, the relevancy metric may be:

$$\text{shot relevancy} = \text{length} \times \Sigma_{n=1}^{F} w_n f_n, \quad (1)$$

where $f_n$ is a content feature value and $\omega_n$ is a weight assigned to the $n^{th}$ content feature. Each of these weights can be empirically determined or defined based on the nature of the content. As an example, in one embodiment, it can be determined that faces and eyes are more important than texture and contrast. In another embodiment, the shot relevancy metric can be defined as follows:

$$\text{shot relevancy} = \sum_{n=1}^{F} \omega_n f_n \quad (2)$$

where $f_n$ and $\omega_n$ are defined as above in Equation 1. In one embodiment that utilizes this metric, a default weight is assigned to each of the content features. In an alternate embodiment, a user uploading a video selects a category relating to the video (e.g., movies, games, music, animation, etc.) and weights are assigned to each of the content features based on the category selected. For example, if the video is in an "Animation" category, there is no reason to give weight to the number of skin pixels in each frame, but it may be desirable to give more weight to brightness or contrast. For animation videos, skin colored pixels are not important since many animated characters are not supposed to be human. Animation videos usually feature animals, moving objects, monsters and aliens. However, most animated characters do possess human-like features and face detection can be useful.

In an embodiment utilizing the exemplary shot relevancy metric shown in Equation 1, the shot with the highest metric is deemed to be "the best shot." In the same or an alternate embodiment, more than one shot is selected.

In another embodiment, a content provider uploading a video is asked to classify the video as a video game, movie, movie trailer, non-profit, etc. When the classification selected is related to a narrative such as a movie trailer, music video, or video game trailer, then the length of the shot may be given additional weight in computing the shot relevancy metric.

A selection operation 332 selects a best shot based on the shot relevancy metric. More than one best shot may be chosen if more than one thumbnail is desired. Computational operation 332 computes a frame relevancy metric for each frame of the one or more best shots selected. The frame relevancy metric is a value computed for each frame within the best shot(s) selected that is representative of the relevancy and visual appeal of each individual frame. The frame relevancy metric for each frame may take into account, for example, one or more of the same, similar, or additional content features as those discussed above in calculating the shot relevancy metric, such as the average texture value of a shot, the average number of "skin-colored" pixels per frame in the shot, the number of faces present the shot, the number of eyes present in the shot, whether the eyes are open or closed, or the size of the faces or other human features visible in each shot.

Additionally, the frame metric may take into account the location of each particular frame within the shot. There is a higher probability that frames taken at the beginning or at the end of shots will be transition frames and include information from more than one shot, such as fade-ins, fade-outs, swipes, etc. Therefore, it may be desirable to choose a representative thumbnail close to the center of the shot. Thus, in one embodiment, frame location is a content feature that is given more weight in the frame relevancy computation when the frame is closer to the center of the shot.

A selection operation 336 selects one or more of the best representative frames from the winning shot(s). The one or more representative frames selected may be recommended or automatically selected as thumbnail images. In one embodiment, a number of recommended thumbnail images are presented to a user and the user selects one image to be the thumbnail. In another embodiment, one or more recommended thumbnails are automatically associated with the video file and selected as thumbnails.

Selected frames may be subject to additional post-processing. In one embodiment, during a post-processing operation, thumbnail images can be cropped to improve their composition or in another embodiment, they can be enhanced for greater contrast or brightness. In an alternate embodiment, text and/or graphics are added to the final thumbnail images. Another example of enhancing the quality of the selected frame is to add an image to it. In one embodiment, an image can automatically be added to the thumbnail. An example of such an image is the company or the brand's logo or a logo displaying the word "HD" (which stands for high-definition if the video is in high definition). Such logos can come in different sizes and depending on the complexity of the image, a different size might be chosen. In one embodiment, the texture on every corner of each frame is calculated. Then the region with less texture is determined. Based on this information, the size and the location of the HD logo can be automatically adjusted. In yet another embodiment, instead of the logo, some text provided as an input by the user can be added to the selected frame. Font restrictions may be placed on the text to ensure that text added in the final thumbnail image is large enough to be read. In an alternate embodiment, added graphics and/or text may be enhanced in color, resized, or otherwise altered prior to inclusion in the final thumbnail image.

The resulting frames after applying the above operations are then presented to the content creator as possible thumbnails. The content creator can then choose the thumbnail that he or she believes is the best. The default setting of the algorithm might be such that the top ranked frame is automatically selected as the best thumbnail and the process of generating the best thumbnail is done without the intervention of the user.

In one embodiment, the operation 300 for selecting and generating relevant and visually stimulating thumbnails is integrated into a system for creating, optimizing, deploying, and analyzing content on the web. The system may be an online system accessible on the web or a software module, which can be downloaded and/or installed on a personal computer. This system, hereinafter referred to as the "platform" may allow a user to perform a number of operations, such as create or edit a video file; optimize metadata (e.g., titles, descriptions, and tags); create a relevant and visually stimulating thumbnail; deploy the video to one or more video-sharing or social media websites; and provide detailed analytics highlighting the performance of a video or a group of videos. In one embodiment, the platform may contain one or more tools allowing a user to edit or change an audio track in a file. It may also have one or more tools that enable the user to delete or rearrange shots or frames within the file. In another embodiment, the platform may have a metadata recommendation tool (e.g., for recommending title, description and keywords) that suggests keywords for the user to include when sharing the video on a public website such as YouTube, which prompts content providers to enhance the metadata of their videos.

Figure 4:
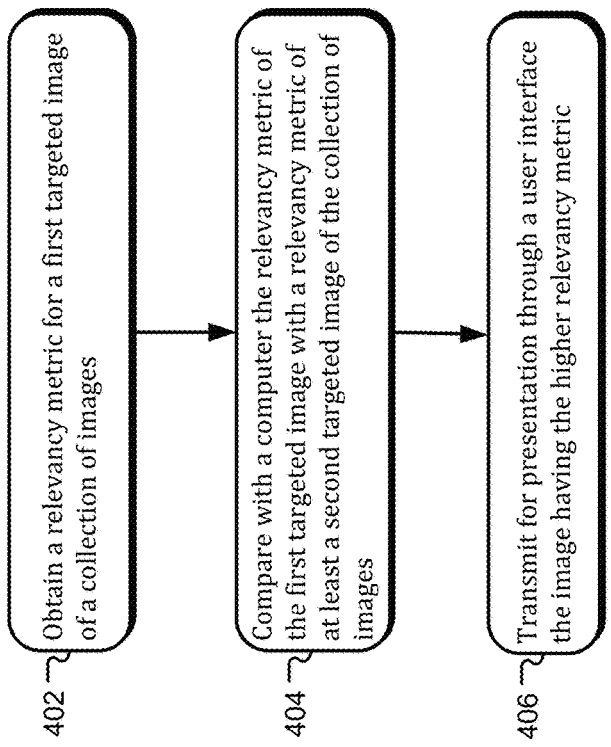
FIG. 4 is a flow chart illustrating a method of selecting a relevant image to represent a collection of images, such as a video, in accordance with one embodiment.

FIG. 4 illustrates an example of selecting an image to represent a collection of images, such as a video. In operation 402, a relevancy metric for a first target image is obtained. The first target image can be an image selected from a collection of images, such as an image from a video. The relevancy metric can be obtained by applying one or more relevancy conditions to the target image so as to generate a score for the image. This process can be repeated for at least a second target image. In operation 404, the relevancy metric of the first target image can be compared with the relevancy metric of the second target image. The comparison operation determines the target image with the higher relevance, based on the compared relevancy metrics. The target image with the higher relevance is then transmitted for presentation through a user interface. For example, the more relevant image is uploaded to a video distribution site, such as YouTube, for use as a thumbnail.

A relevancy metric can be based on one or more content features. A relevancy metric may also indicate the relevancy of an image to the subject matter of a collection of images. In one embodiment, the relevancy metric may include a visual stimulation metric. In another embodiment, the relevancy metric may be based on at least one of a number of faces in a targeted image, a size of a face in a targeted image, a number of eyes in a targeted image, and/or a number of skin-colored pixels in a targeted image. Moreover, a relevancy metric may be based on content located in an off-center position in a targeted image.

The collection of images described in FIG. 4 may be processed by down sampling, downsizing, and/or filtering. Moreover, text, graphics, and/or an additional image may be added to a targeted image.

Figure 5:
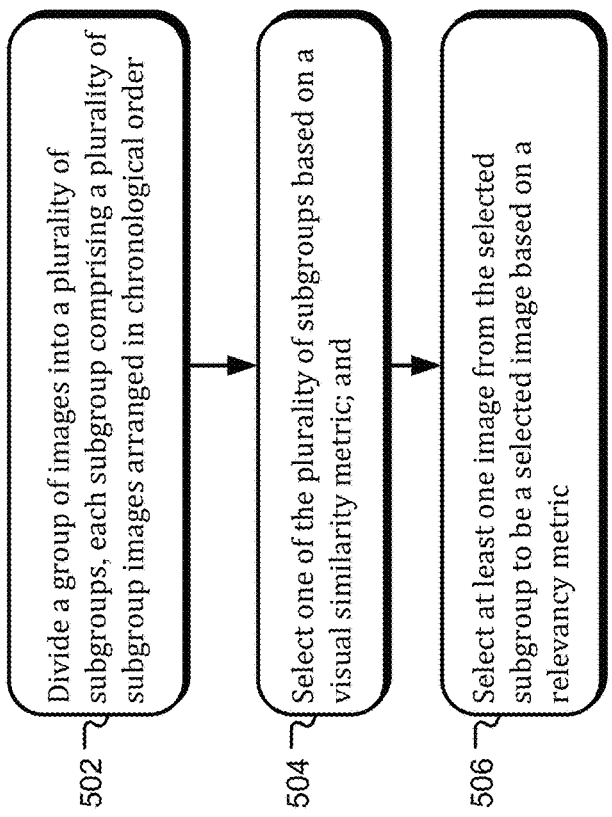
FIG. 5 is another flow chart illustrating a method of selecting a relevant image to represent a collection of images, such as a video, in accordance with one embodiment.

FIG. 5 illustrates another example of selecting an image to represent a collection of images. In operation 502, a collection of images is divided into two or more subgroups. Each subgroup contains its own respective set of subgroup images. In operation 504, one of the subgroups is selected based on a visual similarity metric. In operation 506, one image from the selected subgroup is selected to be a selected image based on a relevancy metric.

The visual similarity metric can be based on a number of images in a selected subgroup. Moreover, the visual similarity metric can be based on at least one of a number of faces in an image, a size of a face in an image, a number of eyes in an image, and a number of skin-colored pixels in an image. Also, the selected image may be resized or filtered.

Figure 6:
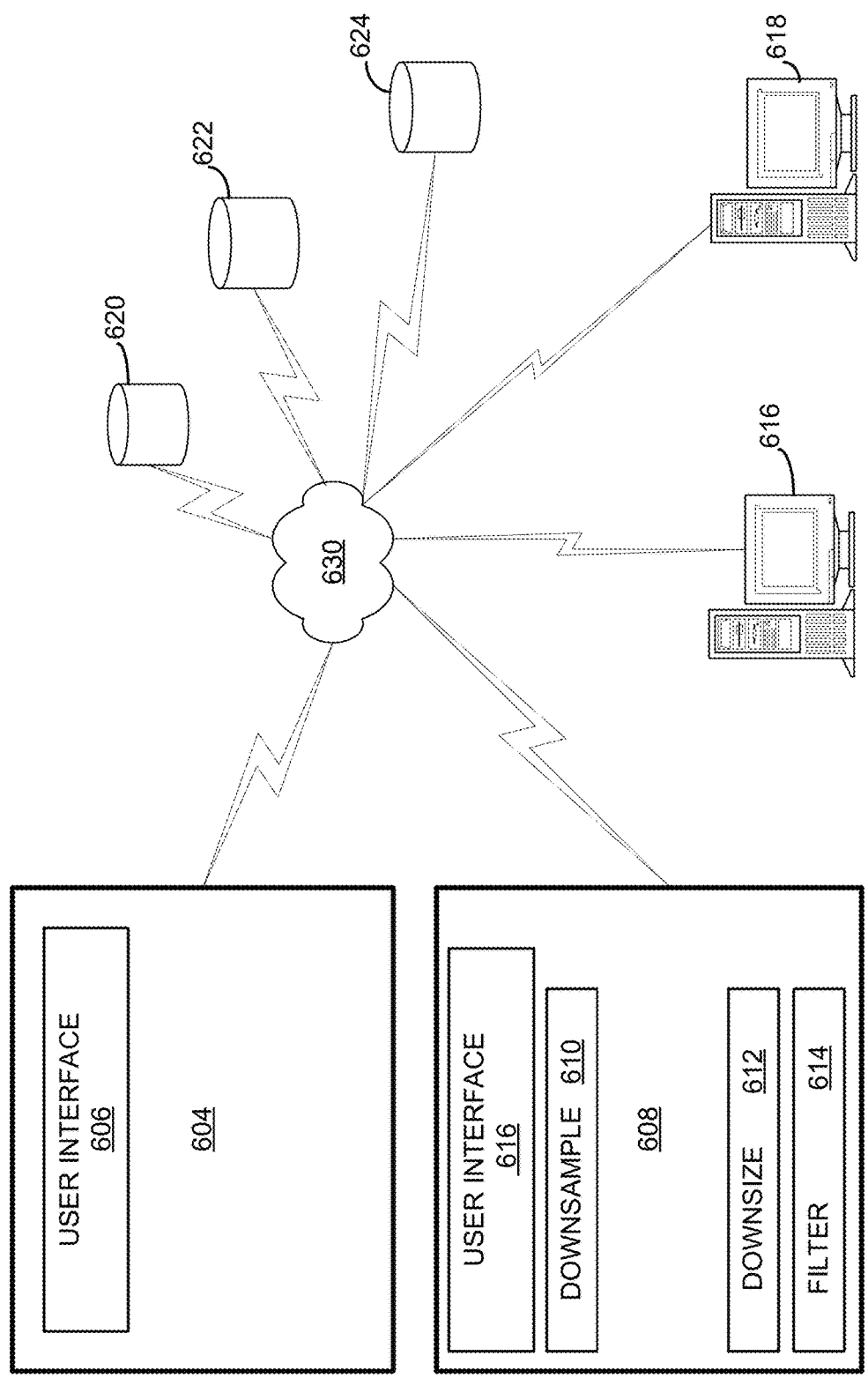
FIG. 6 is a block diagram illustrating a system for implementing a thumbnail selection process, in accordance with one embodiment.

FIG. 6 illustrates an example of a system that can be utilized to implement various embodiments discussed herein. FIG. 6 shows a user computer 604. The user computer 604 has a user interface that allows the user to access video content and select thumbnail images for the video content. The interface also allows the user to add text or an image (e.g., logo) to a thumbnail. Moreover, the user computer allows the user to upload data to a video distribution site, such as YouTube, for example. A second computer is shown in this example as computer 608. In this example, computer 608 is used to process a video in order to generate a more relevant thumbnail image than might originally be provided with a video. Computer 616 is shown having a user interface 616. The computer is shown having some exemplary tools that can be used to process a video as described herein. Computer tool 610 can be software run on computer 608 that allows the computer to downsample a selected video. Computer tool 612 can be software run on computer 608 that allows the computer to downsize a selected video. And, computer tool 614 can be software run on the computer 608 that allows the computer to filter the video. Computer 608 can be utilized by the content provider himself/herself, by a commercial entity separate from the content provider, or by a video distribution site, for example. In this example, a separate entity that is separate from the content provider and video distribution site uses computer 608.

The content provider can select a video (where a video falls into the category of a collection of images) that is stored locally at the content provider's computer or on a remote database 620. Database 622 can be utilized to store software tools that set conditions, such as relevancy conditions, for a targeted image. For example, database 622 can store a computer tool in the form of software that analyzes how many skin tone pixels appear in a targeted image of a video. Database 624 represents a database that stores content features such as images of famous people for comparison to images in a video, for example.

Computers 616 and 618 represent different video distribution sites. One example of a video distribution site is YouTube. Videos can be uploaded to a video distribution site once a thumbnail has been selected in accordance with the methods described herein. Alternatively, a video distribution site might choose to download a video to a third party service provider using computer 608 in order to have a thumbnail selected for the video.

In another example, computer 608 may also be configured to divide a group of images into a plurality of subgroups. Each subgroup can include more than one subgroup images, for example arranged in chronological order. At least one image from the selected subgroup can be selected based on a relevancy metric.

The visual similarity metric can be based on a number of images in a selected subgroup. Moreover, the visual similarity metric can be based on at least one of a number of faces in an image, a size of a face in an image, a number of eyes in an image, and a number of skin-colored pixels in an image. Also, the selected image may be resized or filtered.

Figure 7:
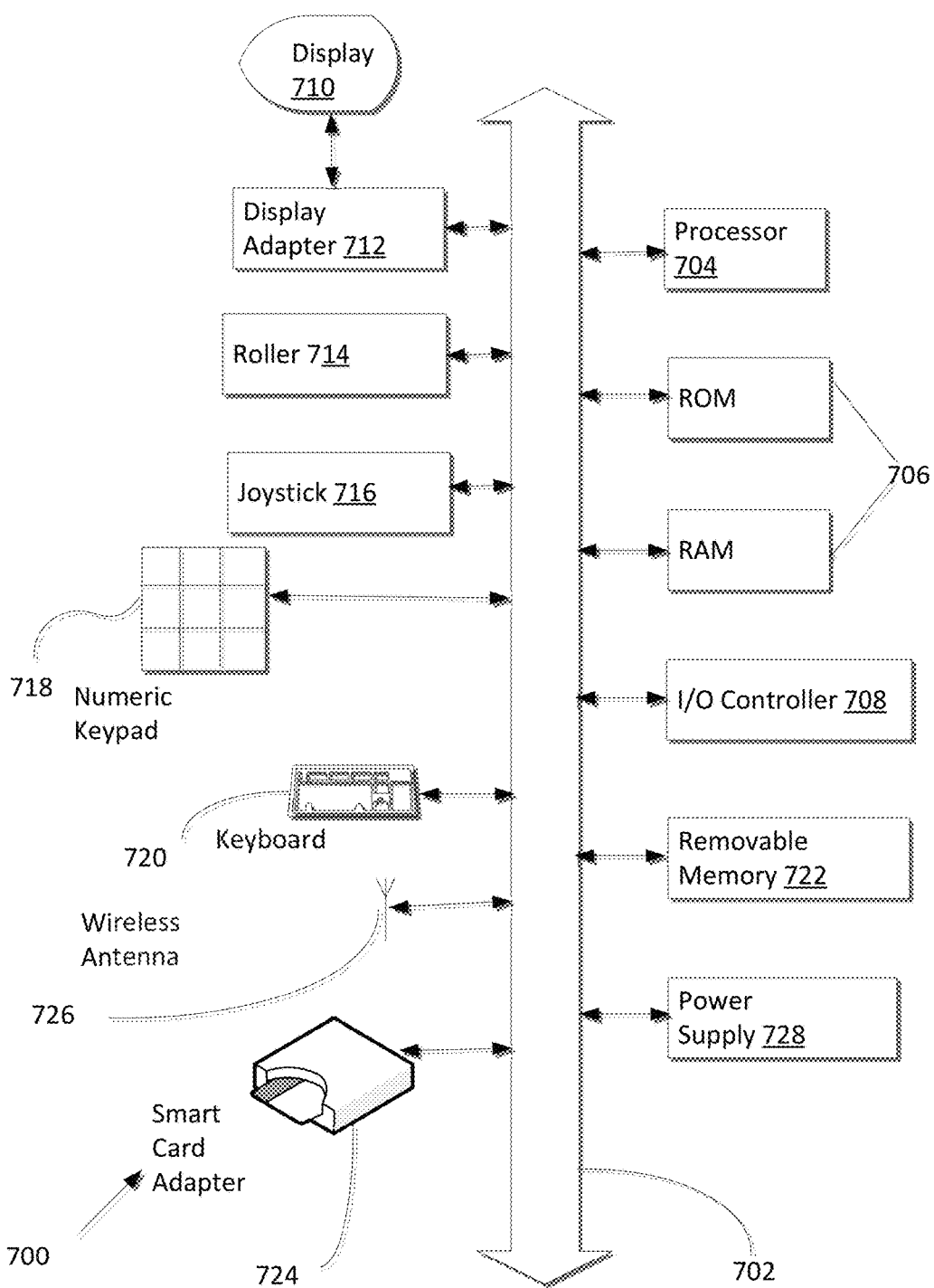
FIG. 7 illustrates an example computer system that may be useful in implementing the described technology.

FIG. 7 discloses a block diagram of a computer system 700 suitable for implementing aspects of at least one embodiment. The computer system 700 may be used to implement one or more components of the intelligent thumbnail generation tool disclosed herein. For example, in one embodiment, the computer system 700 may be used to implement each of the server 702, the client computer 708, and the intelligent thumbnail selection and generation tool stored in an internal memory 706 or a removable memory 722. As shown in FIG. 7, system 700 includes a bus 702 which interconnects major subsystems such as a processor 704, internal memory 706 (such as a RAM or ROM), an input/output (I/O) controller 708, removable memory (such as a memory card) 722, an external device such as a display screen 710 via a display adapter 712, a roller-type input device 714, a joystick 716, a numeric keyboard 718, an alphanumeric keyboard 720, smart card acceptance device 724, a wireless interface 726, and a power supply 728. Many other devices can be connected. Wireless interface 726 together with a wired network interface (not shown), may be used to interface to a local or wide area network (such as the Internet) using any network interface system known to those skilled in the art.

Many other devices or subsystems (not shown) may be connected in a similar manner. Also, it is not necessary for all of the devices shown in FIG. 7 to be present to practice an embodiment. Furthermore, the devices and subsystems may be interconnected in different ways from that shown in FIG. 7. Code to implement one embodiment may be operably disposed in the internal memory 706 or stored on storage media such as the removable memory 727, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system 700, code for implementing the intelligent thumbnail selection and generation tool may be stored in the internal memory 706 and configured to be operated by the processor 704.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not all of the routine functions of the embodiments described herein are shown and described. It will, of course, be appreciated that in the development of any such actual embodiment, numerous implementation-specific decisions must be made in order to achieve the developer's specific goals, such as compliance with application—and business-related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows 8, Windows 7, Windows Vista™, Windows NT®, Windows XP PRO, and Windows® 2000, available from Microsoft Corporation of Redmond, Wash., Apple OS X-based systems, available from Apple Inc. of Cupertino, Calif., BlackBerry OS, available from Blackberry Inc. of Waterloo, Ontario, Android, available from Google Inc. of Mountain View, Calif. or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different implementations may be combined in yet another implementation without departing from the recited claims.

The invention claimed is:

1. A method for recommending a thumbnail image representative of a collection of images, the method comprising:
  computing a relevancy metric for each image of the collection of images, wherein the relevancy metric is computed based on at least one image characteristic selected from the group consisting of:
    a size of a face in the image, wherein the relevancy metric is influenced in a first direction more when the face is large than when the face is small;
    a number of eyes in the image, wherein the relevancy metric is influenced in the first direction more when the number of eyes is large than when the number of eyes is small;
    a number of open eyes in the image, wherein the relevancy metric is influenced in the first direction more when the number of open eyes is large than when the number of open eyes is small;
    an object or face in the image, wherein the relevancy metric is influenced in the first direction more when the object or face is identified as corresponding to a database entry than when the object or face is unidentified;
    a computed brightness for the image, wherein the relevancy metric is influenced in the first direction more for brightness values within a predetermined brightness range than for brightness values outside of the predetermined brightness range;
    a number of skin-colored pixels in the image, wherein the relevancy metric is influenced in the first direction more when the number of skin-colored pixels is large than when the number of skin-colored pixels is small;
  identifying a subset of the collection of images that each have a relevancy metric influenced in the first direction by an amount that satisfies a predetermined threshold; and
  transmitting for presentation through a user interface the identified subset of the collection of images.

2. The method of claim 1 further comprising:
  presenting the identified subset of the collection of images alongside an original thumbnail image; and
  receiving user feedback identifying a select image of the presented images.

3. The method of claim 2 further comprising:
  transmitting the select image to a video distribution site for use as a thumbnail image for an associated video.

4. The method of claim 2, further comprising adding text, graphics, or an additional image to the select image.

5. The method of claim 1 further comprising:
  wherein the relevancy metric for an image is influenced more heavily in the first direction when a number of faces in the first targeted image is large than when a number of faces in the first targeted image is small.

6. The method of claim 1 wherein the relevancy metric for the first targeted image is influenced more heavily in the first direction more when a degree of contrast is high than when a degree of contrast is low.

7. The method of claim 1 and further comprising at least one of downsizing, down sampling, or filtering of the collection of images.

8. The method of claim 1, wherein the relevancy metric of each image in the collection of images is based on at least one of texture or brightness.

9. The method of claim 1 wherein the relevancy metric for an image is influenced more in the first direction when a region of interest is located in an off-center position in the image than when a region of interest is located in a central position in the image.

10. One or more computer-readable storage media of a tangible article of manufacture encoding computer-executable instructions for executing on a computer system a computer process, the computer process comprising:
selecting at least one image from a collection of images to be a selected image based on at least one image characteristic selected from the group consisting of:
a size of a face in the image, wherein an image of the collection is more likely to be the selected image when the size of the face is large than when the size of the face is small;
a number of eyes in the image, wherein an image of the collection is more likely to be the selected image when the number of eyes is large than when the number of eyes is small;
a number of "skin-colored" pixels in the image, wherein an image of the collection is more likely to be the selected image when the number of skin-colored pixels is large than when the number of skin-colored pixels is small;
a computed brightness for the image, wherein the relevancy metric is influenced in the first direction more for brightness values within a predetermined brightness range than for brightness values outside of the predetermined brightness range;
an object or face in the image, wherein an image of the collection is more likely to be the selected image when the object or face is identified as corresponding to a database entry than when the object or face is unidentified; and
a number of open eyes in the first targeted image, wherein an image of the collection is more likely to be the selected image when the number of open eyes is large than when the number of open eyes is small.

11. The one or more computer-readable storage media of claim 10, wherein the computer process further comprises:
dividing a group of images into a plurality of subgroups, each subgroup comprising a plurality of subgroup images arranged in chronological order, wherein the collection of images is a subgroup selected from the plurality of subgroups based on a visual similarity metric.

12. The one or more computer-readable storage media of claim 11, wherein the visual similarity metric is based on a number of images in the selected subgroup.

13. The one or more computer-readable storage media of claim 10, wherein the visual similarity metric is based on at least one of a number of faces in an image, a size of a face in an image, a number of eyes in an image, a number of "skin-colored" pixels in an image, texture in an image, brightness in an image, and contrast of an image.

14. The method of claim 10, wherein an image of the selected subgroup is more likely to be the selected image when a region of interest is located in an off-center position in the image than when a region of interest is located in a central position in the image.

15. A system comprising:
memory;
a module stored in the memory and executable by a processor, the module configured to:
compute a relevancy metric for each image of a collection of images based on an image characteristic selected from the group consisting of:
a size of a face in the image, wherein the relevancy metric is influenced in a first direction more when the face is large than when the face is small;
a number of eyes in the image, wherein the relevancy metric is influenced in the first direction more when the number of eyes is large than when the number of eyes is small;
a number of open eyes in the image, wherein the relevancy metric is influenced in the first direction more when the number of open eyes is large than when the number of open eyes is small;
an object or face in the image, wherein the relevancy metric is influenced in the first direction more when the object or face is identified as corresponding to a database entry than when then object or face is unidentified;
a computed brightness for the image, wherein the relevancy metric is influenced in the first direction more for brightness values within a predetermined brightness range than for brightness values outside of the predetermined brightness range;
a number of skin-colored pixels in the image, wherein the relevancy metric is influenced in the first direction more when the number of skin-colored pixels is large than when the number of skin-colored pixels is small;
identify a subset of the collection of images, the subset including images that each have a relevancy metric influenced in the first direction by an amount that satisfies a predetermined threshold;
transmit for presentation through a user interface the identified subset of one or more images.

16. The system of claim 15, wherein the module is further configured to:
present the identified subset of the collection of images alongside an original thumbnail image; and
receive user feedback specifying a select image of the presented images.

17. The system of claim 16, wherein the module is further configured to:
transmit the select image to a video distribution site for use as a thumbnail image for an associated video.

18. The system of claim 17, wherein the module is further configured to:
add text, graphics, or an additional image to the select image.

19. The system of claim 17, wherein the module is further configured to perform at least one task from the collection of tasks comprising: downsizing, down sampling, and filtering the collection of images.

20. The method of claim 1, wherein the relevancy metric of each image in the collection of images is based on at least one of texture or brightness.

* * * * *